United States Patent
Beck et al.

(10) Patent No.: US 12,522,226 B2
(45) Date of Patent: Jan. 13, 2026

(54) SYSTEM FOR REDUCING INCOMPLETE DIAGNOSTIC TEST CYCLES

(71) Applicant: FCA US LLC, Auburn Hills, MI (US)

(72) Inventors: Stephanie R Beck, Pinckney, MI (US); Anthony N Gorney, Oxford, MI (US); Roger C Sager, Munith, MI (US); Scott E Henson, Chelsea, MI (US)

(73) Assignee: FCA US LLC, Auburn Hills, MI (US)

( * ) Notice: Subject to any disclaimer, the term of this patent is extended or adjusted under 35 U.S.C. 154(b) by 161 days.

(21) Appl. No.: 18/475,694

(22) Filed: Sep. 27, 2023

(65) Prior Publication Data

US 2025/0100563 A1    Mar. 27, 2025

(51) Int. Cl.
*B60W 50/02*    (2012.01)
*F02D 41/22*    (2006.01)
*F02P 5/15*    (2006.01)

(52) U.S. Cl.
CPC ......... *B60W 50/0205* (2013.01); *F02D 41/22* (2013.01); *F02P 5/1502* (2013.01); *B60W 2420/403* (2013.01); *B60W 2420/408* (2024.01); *B60W 2510/0638* (2013.01); *B60W 2510/0676* (2013.01); *B60W 2520/00* (2013.01); *B60W 2554/4029* (2020.02); *B60W 2555/20* (2020.02)

(58) Field of Classification Search
CPC ......... B60W 50/0097; B60W 50/0205; B60W 60/0027; B60W 2420/403; B60W 2420/408; B60W 2510/0676; B60W 2510/068; B60W 2510/0638; B60W 2510/285; B60W 2510/0619; B60W 2520/00; B60W 2520/10; B60W 2554/40; B60W 2554/4026; B60W 2554/4029; B60W 2554/80; B60W 2555/20; F02D 41/22; F02D 41/0002; F02D 41/30; F02D 2200/0618; F02D 2200/501; F02D 2200/701; F02D 2250/32; F02P 5/1502; G01M 15/04; G01M 17/00
See application file for complete search history.

(56) References Cited

U.S. PATENT DOCUMENTS

| | | | |
|---|---|---|---|
| 9,824,505 B2 * | 11/2017 | Tseng | G07C 5/00 |
| 2014/0058596 A1 * | 2/2014 | Martin | B60W 50/0205 903/903 |
| 2016/0040630 A1 * | 2/2016 | Li | F02M 25/0809 73/40.5 R |
| 2018/0283233 A1 * | 10/2018 | Kachi | F02D 13/0226 |
| 2020/0003143 A1 * | 1/2020 | Dudar | B60W 10/06 |
| 2022/0146357 A1 * | 5/2022 | Maclennan | G01C 21/3461 |

* cited by examiner

*Primary Examiner* — Brandon Z Willis
(74) *Attorney, Agent, or Firm* — Jeremy J. Klobucar

(57) ABSTRACT

In at least some implementations, a method for initiating a test cycle in a vehicle diagnostic includes determining if vehicle operation parameters meet enablement criteria for a test cycle, determining a time to an impediment, comparing the time to the impediment to a duration of the test cycle, and initiating the test cycle when the time to the impediment is greater than the duration of the test cycle, and not initiating the test cycle when the time to the impediment is less than the duration of the test cycle.

19 Claims, 2 Drawing Sheets

SYSTEM FOR REDUCING INCOMPLETE DIAGNOSTIC TEST CYCLES

FIELD

The present disclosure relates to a system for reducing incomplete diagnostic test cycles.

BACKGROUND

Vehicles include onboard diagnostic systems that run tests to ensure proper operation of vehicle components or systems. Some tests require the vehicle to be operated within a range of speeds and the tests take a certain amount of time to complete. If the vehicle speed falls outside of the range during the test, then the test is not completed. Failed tests can be annoying to vehicle occupants or interfere with accurate determination of component or system operation. There is a need to reduce the number of incomplete tests.

SUMMARY

In at least some implementations, a method for initiating a test cycle in a vehicle diagnostic includes determining if vehicle operation parameters meet enablement criteria for a test cycle, determining a time to an impediment, comparing the time to the impediment to a duration of the test cycle, and initiating the test cycle when the time to the impediment is greater than the duration of the test cycle, and not initiating the test cycle when the time to the impediment is less than the duration of the test cycle.

In at least some implementations, the time to the impediment is determined as a function of the distance to the impediment and the vehicle speed. In at least some implementations, the impediment is a physical object within a path of travel of the vehicle. In at least some implementations, the physical object is detected with one or more detectors of the vehicle. In at least some implementations, the detectors include one or more of a camera, LIDAR sensor or RADAR sensor.

In at least some implementations, the impediment is a navigation obstacle and is determined with a navigation interface of the vehicle. In at least some implementations, the vehicle includes a control system capable of controlling at least one drive input as a function of a vehicle path of travel as determined by the navigation interface. In at least some implementations, the time to the impediment is determined as a function of an assumed vehicle speed along the path of travel between a current vehicle position and the impediment.

In at least some implementations, the vehicle operating parameters include one or more of a vehicle speed, an ambient temperature, a fuel level, an engine rotary speed, an engine oil temperature, an engine coolant temperature, an engine temperature, and a duration of vehicle operation. In at least some implementations, the enablement criteria include one or more thresholds for the one or more vehicle operating parameters.

In at least some implementations, the test cycle includes varying a fuel to air ratio of a fuel supply to an engine of the vehicle or varying an ignition timing of the engine or varying power output of the engine.

In at least some implementations, a method for initiating a test cycle in a vehicle diagnostic, includes determining if enablement criterion or criteria are met for one or more of a vehicle speed, an ambient temperature, a fuel level, an engine rotary speed, an engine oil temperature, an engine coolant temperature, an engine temperature, and a duration of vehicle operation, and determining existence of an impediment to completion of a test cycle. The method further includes determining the time to the impediment as a function of a vehicle speed and a distance to the impediment, comparing the time to the impediment to a predetermined duration of the test cycle, and initiating the test cycle when the time to the impediment is greater than the duration of the test cycle, and not initiating the test cycle when the time to the impediment is less than the duration of the test cycle.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
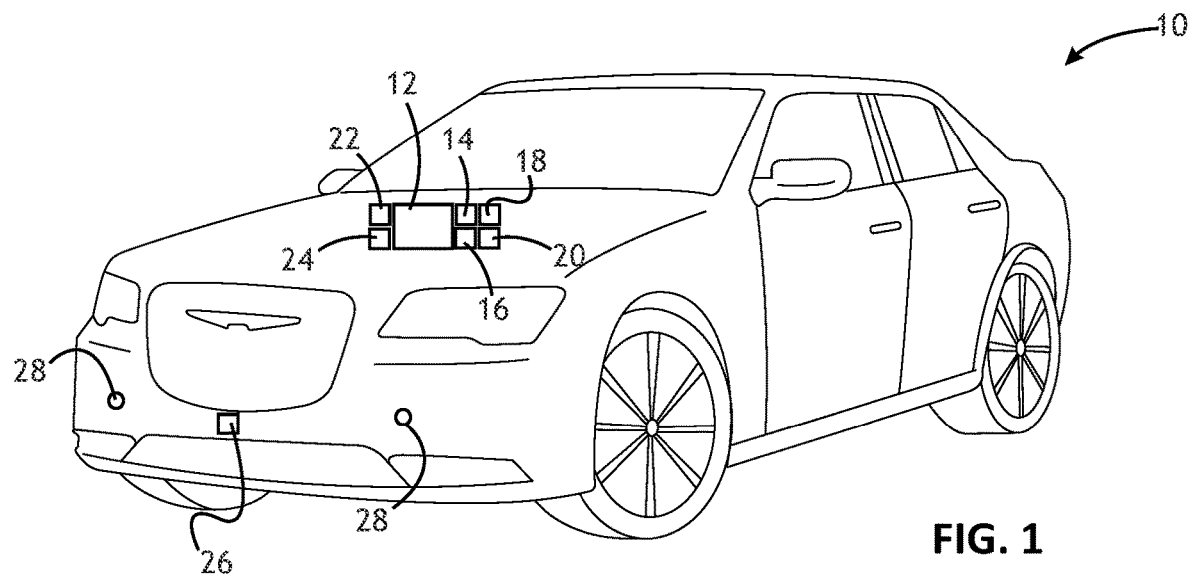
FIG. 1 is a perspective view of a vehicle and a control system for the vehicle.
Figure 2:
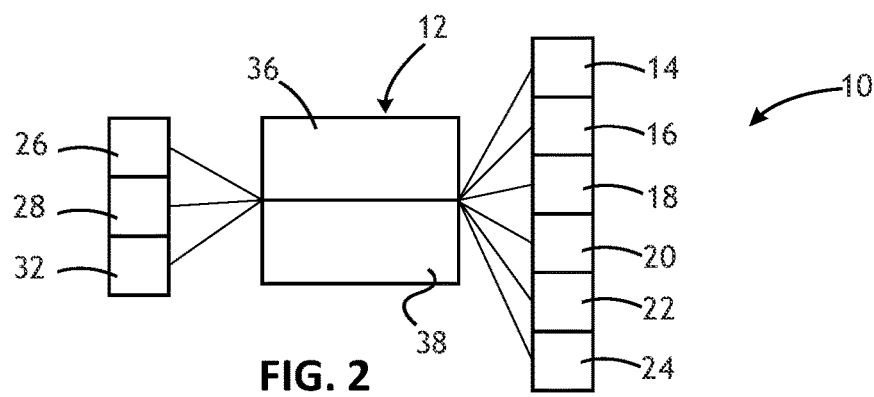
FIG. 2 is a diagrammatic view of the vehicle control system.

Referring in more detail to the drawings, FIGS. 1 and 2 illustrate a vehicle 10 having a control system 12 and one or more sensors, like a vehicle speed sensor 14, engine coolant temperature sensor 16, engine oil temperature sensor 18, ambient temperature sensor 20, engine tachometer 22, accelerometer 24, and the like, the outputs of which are communicated with the control system 12 and may be used as inputs in an on-board diagnostic (OBD) method. The diagnostic method, sometimes called an OBD monitor, may be used to determine satisfactory operation of a component of the vehicle 10, such as an exhaust component like a catalytic converter or a fuel vapor canister or fuel vapor handling circuit. The vehicle manufacturer, a government agency or other entity may set standards or requirements for the frequency at which test cycles are run for various diagnostic methods and/or acceptable pass/fail rates for the diagnostic tests.

Some diagnostic methods require the vehicle 10 to be operating under certain operating parameters in order for a test cycle to be run. For example, the operating parameters may include one or more of a predetermined range of speeds, or a predetermined range of acceleration, or a predetermined temperature range (where the temperature may be one or more of the engine temperature, coolant temperature, oil temperature, ambient temperature, by way of non-limiting examples), or a predetermined time since the engine has been started or the vehicle 10 has been driven, or with a certain range of fuel levels, by way of non-limiting examples. These operating parameters and thresholds may be called enablement criteria as these are the criteria required to enable or initiate a test cycle.

Further, the duration or time for a test cycle to be completed may require one or more enablement criteria to be met for a certain period of time prior to test cycle initiation, or maintained during all or part of the test cycle. In some examples, if, during a test cycle, one or more enablement criteria are no longer met, then the test cycle cannot be completed and a satisfactory test result cannot be reported. For example, if an enablement criterion is that the vehicle speed must be above a certain level and the vehicle 10 slows below a threshold or stops before the test cycle is completed, then the test cycle cannot be completed under appropriate conditions and a satisfactory test result cannot be reported. Further, some diagnostics require a certain time period between tests so a failed test restarts the timer and requires additional time until the next test cycle can be initiated. This can reduce the opportunity to preform a desired number of tests within a period of vehicle operation, and can reduce the number of completed tests within the period of vehicle operation.

Beyond the desire to complete test cycles to meet requirements for frequency or number of test cycles, certain diagnostic methods may alter the performance of the vehicle in a way that is noticeable to a vehicle driver or occupant. By way of non-limiting examples, some diagnostic methods change the fuel to air ratio or ignition timing in an internal combustion engine, which can cause the engine power output to change and a resulting torque change or bump can be noticeable to a vehicle occupant. Thus, limiting the number of test cycles needed to be implemented to achieve a required or desired number of completed test cycles can improve the driving experience and user satisfaction.

To reduce the number or incomplete or erroneous test cycles performed for a diagnostic method, the control system 12 can determine whether an impediment to completion of the test is present within the vehicle path of travel. In at least some examples, the system detects an impediment to test completion by detecting the presence of an obstacle in the vehicle path of travel that will or is likely to cause the vehicle operation to fall outside the operating parameters/enablement criteria for the diagnostic method. For example, if an obstacle in the vehicle path will require the vehicle 10 to slow down or stop before completion of the test cycle, and when such slowing or stopping will cause an operating parameter to fall to outside of one or more thresholds, then the control system 12 can prevent the test cycle from being started. An object could be, by way of non-limiting examples, another vehicle, a person, an animal, or any other physical thing detected on a road on which the vehicle 10 is traveling.

Such obstacles can be detected in any suitable way, including by use of a camera 26, or sensors 28 like LIDAR or RADAR based sensors such as are used by other vehicle systems like automatic braking, lane keeping assistance, Advanced Driver Assistance Systems (ADAS) that provide partial or fully automated driving capabilities, and the like. In this way, the vehicle control system 12 may be capable of controlling one or more drive inputs of the vehicle 10, like steering, accelerating and braking, and may do so for all or part of the vehicle 10 travel along the path of travel, or only for shorter durations, like in crash avoidance or other instances. These detectors 26, 28 can be part of or communicated with the vehicle control system 12 that is also coupled to the sensors used in the test cycle to provide data relating to the vehicle operating parameters that can be checked against the enablement criteria/thresholds. The determination as to whether a test cycle can be completed, when an obstacle is detected that might be an impediment to completion of a test cycle, can be made as a function of the vehicle speed and the distance to the obstacle, as well as the time needed to run a complete test cycle.

Figure 3:
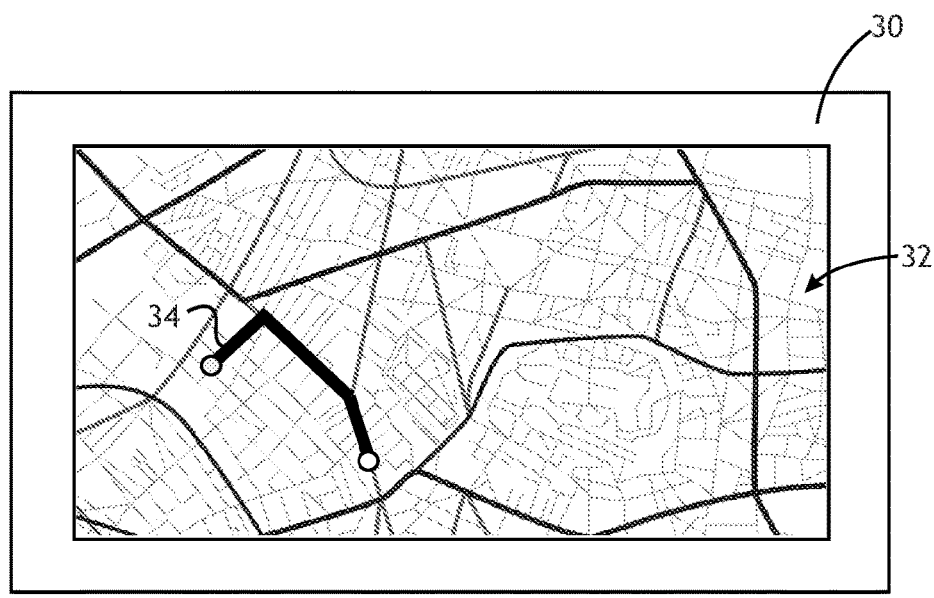
FIG. 3 is a view of a vehicle display screen showing a navigation interface and a path of travel.

An impediment may also include things other than obstacles in the path of travel, such as, but not limited to, navigation obstacles requiring expected turns or change in speed up to and including stops in the vehicle travel. Such navigation obstacles may be determined in advance via a vehicle navigation system in which a path of travel has been inputted. FIG. 3 shows a display screen 30 of the vehicle 10 with an output display from the navigation interface 32 shown on the display screen 30 and including a path of travel 34. Along the path of travel 34, upcoming turns, intersections, vehicular traffic, construction zones and the like may be determined in advance. If one or more navigation obstacles are likely to cause an operating parameter to fall outside a threshold within the duration of a test cycle, then the control system 12 can use the information regarding the navigation obstacles to prevent a test cycle from being started. This determination can be made as a function of the vehicle speed and the distance to the navigation obstacle, as well as anticipated change in vehicle speed when the navigation obstacle is encountered and the time needed to run a complete test cycle. That is, the control system 12 may determine the time to a navigation obstacle as a function of an assumed vehicle speed along the path of travel between a current vehicle position and the impediment. The assumed vehicle speed may include data from the navigation interface (e.g. speed limits, current speeds of vehicles ahead on the path of travel, traffic conditions, construction zones, and other information) regarding conditions along the path of travel between the current position of the vehicle 10 and the impediment.

In this way, a method of performing a test cycle can include a step of determining if an impediment to completion of a test cycle is detected, and if so, the method may avoid implementing the test cycle. This step can be in addition to other steps preliminary to the test cycle, such as ensuring the enablement criterion or criteria are met (e.g. that vehicle operating parameters are within the threshold(s) for such parameters). In this way, the number of incomplete test cycles can be decreased and the percentage or ratio of completed test cycles to incomplete test cycles can be increased.

In order to perform the prescribed functions and desired processing, as well as the computations therefore (e.g., the identification of a pedestrian impact, control algorithm(s), and the like), the control system 12 or one or more controllers may include, but not be limited to, a processor(s) 36 (FIG. 2), computer(s), DSP(s), memory 38 (FIG. 2), storage, register(s), timing, interrupt(s), communication interface(s), and input/output signal interfaces, and the like, as well as combinations comprising at least one of the foregoing. For example, controller 36 may include input signal processing and filtering to enable accurate sampling and conversion or acquisitions of such signals from sensors and communications interfaces.

As used herein the terms control system 12 or controller or processor may refer to one or more processing circuits such as an application specific integrated circuit (ASIC), an electronic circuit, a processor (shared, dedicated, or group) and memory that stores data/files and permits execution of one or more software or firmware programs, a combinational logic circuit, and/or other suitable components that provide the described functionality.

Figure 4:
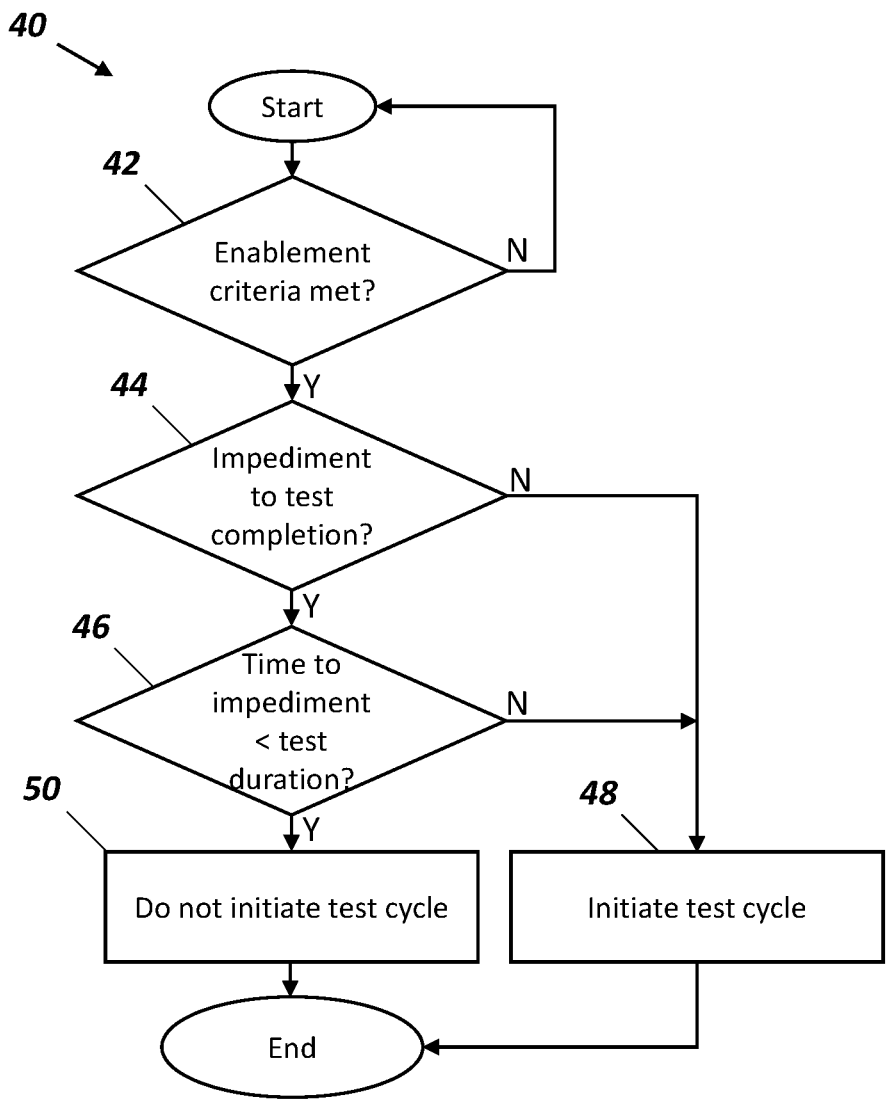
FIG. 4 is a flowchart of a method for determining if a test cycle can be completed based upon vehicle operating parameters.

FIG. 4 shows a method 40 for determining whether to run a test cycle for a vehicle diagnostic. In step 42 it is determined if the vehicle operating parameters satisfy the thresholds associated with the operating parameters, in other words, whether all enablement criteria required to initiate a test cycle is met. If not, then the test cycle will not be run and the method may return to the start. If the enablement criteria are satisfied, then the method may proceed to step 44 in which it is determined if any impediments exist that might change the vehicle operating parameters during a test cycle. This determination may be made as a function of the vehicle speed, acceleration and distance to the impediment, such as an obstacle in the road or a navigation obstacle. This provides an estimated time until the obstacle is encountered by the vehicle 10, and this estimated time can be compared to the duration for a test cycle in step 46.

If the estimated time is greater than the duration of the test cycle, indicating that the impediment isn't likely to interfere with completion of the test cycle, then the test cycle is implemented in step 48 and the method ends or returns to step 42 for a new iteration of the method. If the estimated time is less than the duration of the test cycle, indicating that the impediment is likely to interfere with completion of the test cycle, then the test cycle is not implemented in step 50 and the method ends or returns to step 42.

In an example relating to purging of fuel vapor from a fuel tank, a diagnostic method may include a test cycle that compares the difference in fuel tank pressure before and after a vapor purging routine is performed to a threshold pressure differential. The vapor purging routine may include opening a valve to vent fuel vapor from the fuel tank to a vapor canister and/or to an intake manifold of the engine. The purging routine thus reduces the pressure within the fuel tank, and the routine takes a certain amount of time to complete. Using the method of FIG. 4, before the test cycle for the vapor purge routine is started, by way of non-limiting examples, the vehicle speed, the ambient temperature, the fuel level, the engine rotary speed (e.g. RPMs), and the engine coolant temperature need to be within a predetermined range, and the time to an impediment needs to be greater than the duration of (e.g. the time to complete) the test cycle.

In an example relating to checking operation of a catalytic converter, a diagnostic method may include a test cycle that compares inputs and outputs of the catalytic converter, such as by checking the outputs of oxygen sensors upstream and downstream of the converter. During a test cycle, the fuel to air ratio of a fuel supply to the engine may be altered to vary the contents of engine exhaust in a known manner so that the efficiency or performance of the catalytic converter can be monitored. Using the method of FIG. 4, before the test cycle for the catalytic converter is started, by way of non-limiting examples, the vehicle speed, the ambient temperature, the engine rotary speed (e.g. RPMs), the engine coolant temperature, and the time that the engine has been running need to be within a predetermined range, and the time to an impediment needs to be greater than the duration of (e.g. the time to complete) the test cycle.

With an impediment determination based on physical obstacle detection and/or navigation obstacles, the systems and methods described herein are well-suited for use with ADAS enabled vehicles, in which the vehicle control system 12 manages or controls at least one vehicle drive input (e.g. steering, acceleration, braking) as a function of a vehicle path of travel as determined by the vehicle navigation interface. However, the systems and methods described herein can be used by any vehicle with obstacle detection sensors and/or a navigation interface from which a path of travel is known. The systems and methods add an enablement criterion to vehicle operating parameters, where the enablement criterion is that no impediment is detected or determined to be within a time-wise limit of a test cycle to be initiated.

What is claimed is:

1. A method for initiating a test cycle in a vehicle diagnostic, comprising:
   determining if vehicle operation parameters meet enablement criteria for a test cycle;
   determining a time to an impediment, wherein the time to the impediment is determined as a function of the distance to the impediment and the vehicle speed;
   comparing the time to the impediment to a duration of the test cycle; and
   initiating the test cycle when the vehicle is moving and when the time to the impediment is greater than the duration of the test cycle, and not initiating the test cycle when the vehicle is not moving and when the time to the impediment is less than the duration of the test cycle.

2. The method of claim 1 wherein the impediment is a physical object within a path of travel of the vehicle.

3. The method of claim 2 wherein the physical object is detected with one or more detectors of the vehicle.

4. The method of claim 3 wherein the detectors include one or more of a camera, LIDAR sensor or RADAR sensor.

5. The method of claim 1 wherein the impediment is a navigation obstacle and is determined with a navigation interface of the vehicle.

6. The method of claim 5 wherein the vehicle includes a control system capable of controlling at least one drive input as a function of a vehicle path of travel as determined by the navigation interface.

7. The method of claim 5 wherein the time to the impediment is determined as a function of an assumed vehicle speed along a determined path of travel between a current vehicle position and the impediment.

8. The method of claim 1 wherein the vehicle operating parameters include one or more of a vehicle speed, an ambient temperature, a fuel level, an engine rotary speed, an engine oil temperature, an engine coolant temperature, an engine temperature, and a duration of vehicle operation.

9. The method of claim 8 wherein the enablement criteria include one or more thresholds for the one or more vehicle operating parameters.

10. The method of claim 1 wherein the test cycle includes varying a fuel to air ratio of a fuel supply to an engine of the vehicle or varying an ignition timing of the engine or varying power output of the engine.

11. A method for initiating a test cycle in a vehicle diagnostic, comprising:
    determining if enablement criterion or criteria are met for one or more of a vehicle speed, an ambient temperature, a fuel level, an engine rotary speed, an engine oil temperature, an engine coolant temperature, an engine temperature, and a duration of vehicle operation;
    determining existence of an impediment to completion of a test cycle, wherein the impediment is at a different location than the current vehicle location and the impediment will be encountered by the vehicle after movement of the vehicle from the current vehicle location;
    determining the time to the impediment as a function of a vehicle speed and a distance between the current vehicle location and the impediment;
    comparing the time to the impediment to a predetermined duration of the test cycle; and initiating the test cycle when the time to the impediment is greater than the duration of the test cycle, and not initiating the test cycle when the time to the impediment is less than the duration of the test cycle.

12. The method of claim 11 wherein the time to the impediment is determined as a function of the distance to the impediment and an assumed vehicle speed along a determined path of travel between a current vehicle position and the impediment.

13. The method of claim 12 wherein the impediment is a physical object within the path of travel of the vehicle.

14. The method of claim 13 wherein the physical object is detected with one or more detectors of the vehicle.

15. The method of claim 14 wherein the detectors include one or more of a camera, LIDAR sensor or RADAR sensor.

16. The method of claim 12 wherein the impediment is a navigation obstacle and is determined with a navigation interface of the vehicle.

17. The method of claim 16 wherein the vehicle includes a control system capable of controlling at least one drive input as a function of a vehicle path of travel as determined by the navigation interface.

18. The method of claim 16 wherein the time to the impediment is determined as a function of an assumed vehicle speed along the path of travel between a current vehicle position and the impediment.

19. The method of claim 11 wherein the test cycle includes varying a fuel to air ratio of a fuel supply to an engine of the vehicle or varying an ignition timing of the engine or varying power output of the engine.

* * * * *